United States Patent [19]

Yamamoto et al.

[11] Patent Number: 4,862,095

[45] Date of Patent: Aug. 29, 1989

[54] WIRE ELECTRODE BREAKAGE DETECTION METHOD AND APPARATUS

[75] Inventors: Masahiro Yamamoto; Takeshi Yatomi, both of Aichi, Japan

[73] Assignee: Mitsubushi Denki Kabushiki Kaishà, Tokyo, Japan

[21] Appl. No.: 739,260

[22] Filed: May 30, 1985

[30] Foreign Application Priority Data

May 30, 1984 [JP] Japan ................................ 59-108659

[51] Int. Cl.[4] ............................................ G01R 31/00

[52] U.S. Cl. .................................... 324/543; 324/556; 324/537; 219/69 W

[58] Field of Search ................... 324/51, 52, 537, 543, 324/556; 200/61.13, 61.14; 340/677; 228/103, 104, 8; 29/593; 104/179; 219/69 W, 69 M, 69 S

[56] References Cited

U.S. PATENT DOCUMENTS 4,015,102 3/1977 Zadorozny ....................... 29/593 X
4,365,654 12/1982 Viniczay et al. ............... 340/677 X

FOREIGN PATENT DOCUMENTS 0043673 1/1982 European Pat. Off. ......... 219/69 W
2906245 9/1979 Fed. Rep. of Germany .
3006531 12/1980 Fed. Rep. of Germany .
3107333 3/1982 Fed. Rep. of Germany .
3319935 12/1983 Fed. Rep. of Germany .
55-83532 6/1980 Japan .

*Primary Examiner*—Reinhard J. Eisenzopf
*Assistant Examiner*—Jack B. Harvey
*Attorney, Agent, or Firm*—Sughrue, Mion, Zinn, Macpeak & Seas

[57] ABSTRACT

A method and apparatus for detecting breakage of a wire electrode in an electric discharge machining apparatus, and an apparatus for carrying out this method, whereby breakage of the wire electrode is detected by detecting a change in a current from a detection power source provided separately from the main power source. Current from the detection power source is applied through the wire electrode by a roller in contact therewith. When the wire electrode is unbroken, current passes from the detection power source, through the wire electrode, to an optical coupling circuit, the secondary of the latter driving and indicating circuit. When the wire electrode breaks, the power flow to the primary of the optical coupling circuit is interrupted, thereby indicating breakage of the wire electrode.

16 Claims, 4 Drawing Sheets

31 4 6 34 R1 30 +V 36 32 33 38 C1 C2 35 37 39 5 100 MAIN POWER SOURCE 7 +V R2 V0 C3

1
2
3
4
5
6
7
8
9
10

2
1
9
10
4
6
5
7
3
8

4
6
21
5
20
7
MAIN
POWER
SOURCE
100

WIRE ELECTRODE BREAKAGE DETECTION METHOD AND APPARATUS

BACKGROUND OF THE INVENTION

The present invention relates to a method of detecting breakage of an electrode of an electric discharge machine of the wire electrode type.

A typical example of a conventional system for detecting breakage of a wire electrode of an electric discharge machine is shown schematically in FIG. 1. As seen in FIG. 1, the system includes mechanical limit switches 1, 2 and 3 disposed along the path of a wire electrode 4 passing through a workpiece 5. Machining power is supplied through a pair of feeding dies 6 and 7 which are in contact with the wire electrode 4. The wire electrode 4 is supplied from a supply bobbin 10 through a brake mechanism 9 for controlling the tension in the wire electrode and is recovered in a recovery box 8. The limit switch 1 detects when the wire electrode 4 on the bobbin 10 is consumed.

In such a system, if the wire electrode 4 is broken in the vicinity of the workpiece 5 as shown in FIG. 2, the fact of breakage can be detected by the separation of the wire electrode 4 from the mechanical limit switches 2 and 3.

Since a system using mechanical limit switches utilizes the mechanical displacement of the wire electrode 4 to detect breakage of the wire electrode, it is possible to arrange these switches at any position along the path of the wire. However, the response time of a mechanical switch to wire breakage is considerably slow, potentially causing a problem to occur immediately after the breakage of the wire electrode 4, as exemplarily illustrated in FIG. 3. That is, there may be a case where the supply of power from a main power source 100 to the workpiece 5 and the feeding dies 6 and 7 continues for a relatively long time after the breakage of the wire electrode 4 occurs. It has been found that it takes typically 100 to 300 ms from the time of breakage of the wire electrode 4 to actuation of either or both of the mechanical limit switches, during which time discharge can occur several thousand times. A broken end of the wire electrode 4 may contact a position 20 of the workpiece 5 and, if the wire electrode 4 is separated from the feeding die 6 at a position 21, discharge may occur at the position 21, causing the feeding die 6 to be eroded abnormally. If such undesired discharge is repeated, the surface of the feeding die 6 may become too rough to assure acceptable electrical contact with the wire electrode 4 thereafter. According to an experiment, it has been found that the average service life of a feeding die is only several tens of hours when such wire breakage occurs repeatedly. This means that the service life of the feeding die is considerably shortened by such wire breakage, compared with the usual service life of several hundred hours.

Furthermore, the machining table (not shown) of the electric discharge machine may move during the time from the occurrence of wire breakage to the time the limit switch responds. Therefore, since the position of the table may be remote from the desired working position when a broken wire electrode 4 is repaired, the connected wire electrode 4 may not contact with the workpiece 5, and thus it may be impossible to restart the discharge machining operation without repositioning the table.

Thus, according to the conventional detection system using mechanical limit switches, the service life of the feeding die may be shortened and it is difficult to restart the machining operation if the table is stopped at an advanced position.

SUMMARY OF THE INVENTION

Overcoming these difficulties, the present invention provides a method for electrically detecting breakage of a wire electrode by supplying detection current from a detection power source provided separately from the main power source to the wire electrode and detecting a variation of the detection current due to the breakage of the electrode.

The present invention also provides an apparatus for practicing this method.

DESCRIPTION OF THE PREFERRED EMBODIMENTS

Figure 4:
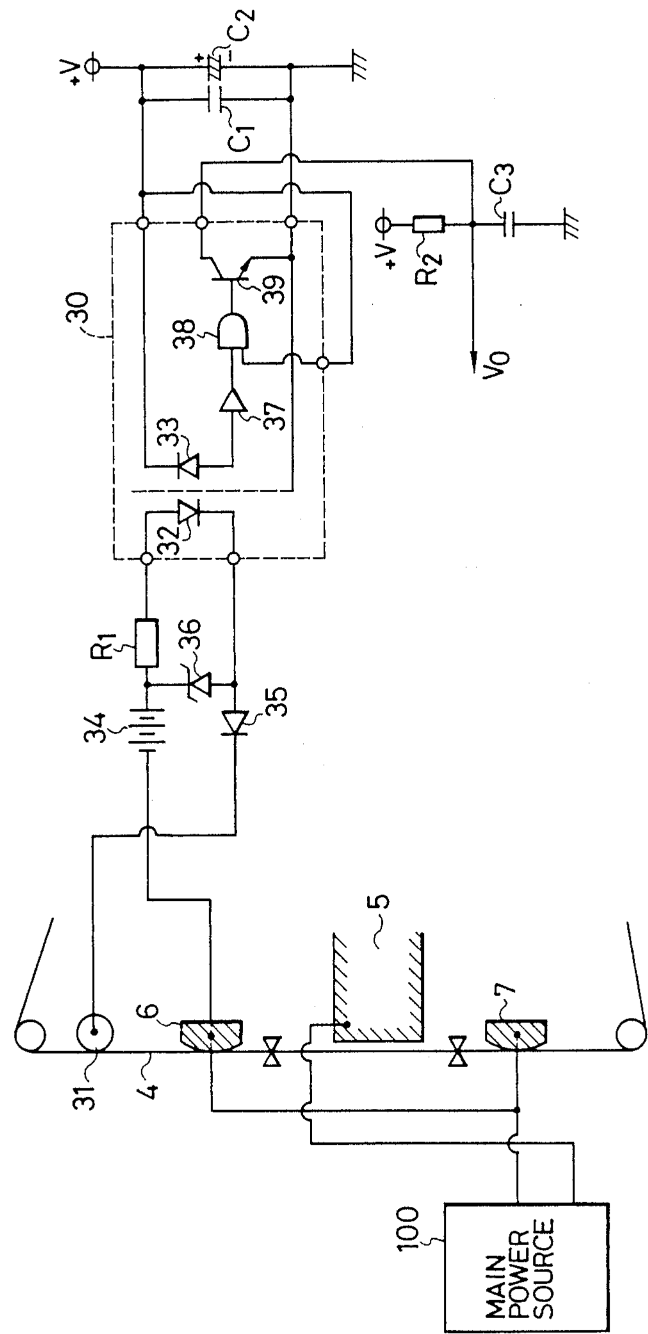
FIG. 4 is a circuit diagram showing an embodiment of the present invention.

FIG. 4 is a circuit diagram of an electric discharge machine constructed according to a preferred embodiment of the present invention. In FIG. 4, same or similar components to those shown in FIG. 1 are depicted by the same reference numerals, and descriptions of these components are omitted for simplification.

Figure 1:
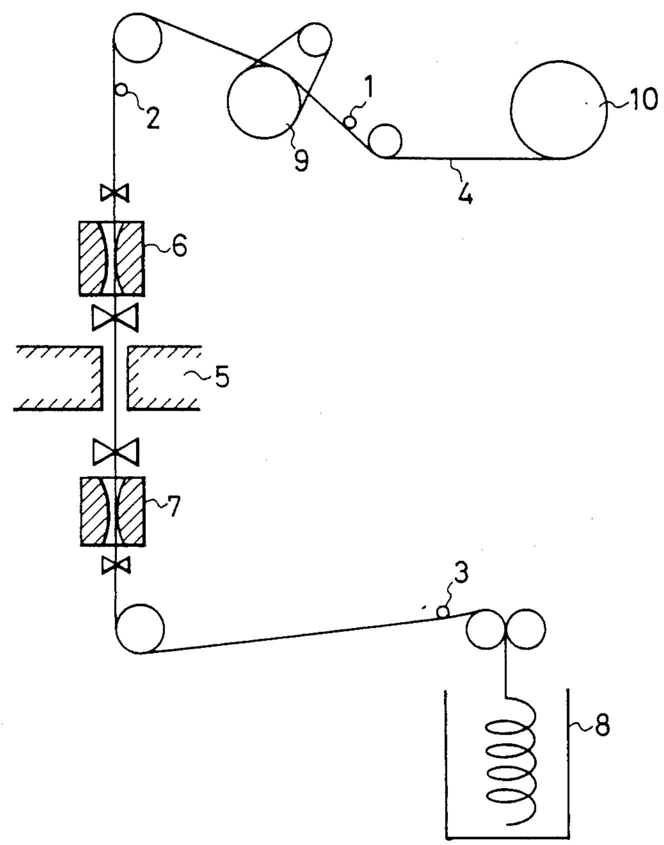
FIG. 1 illustrates a conventional wire electrode breakage detection system.
Figure 2:
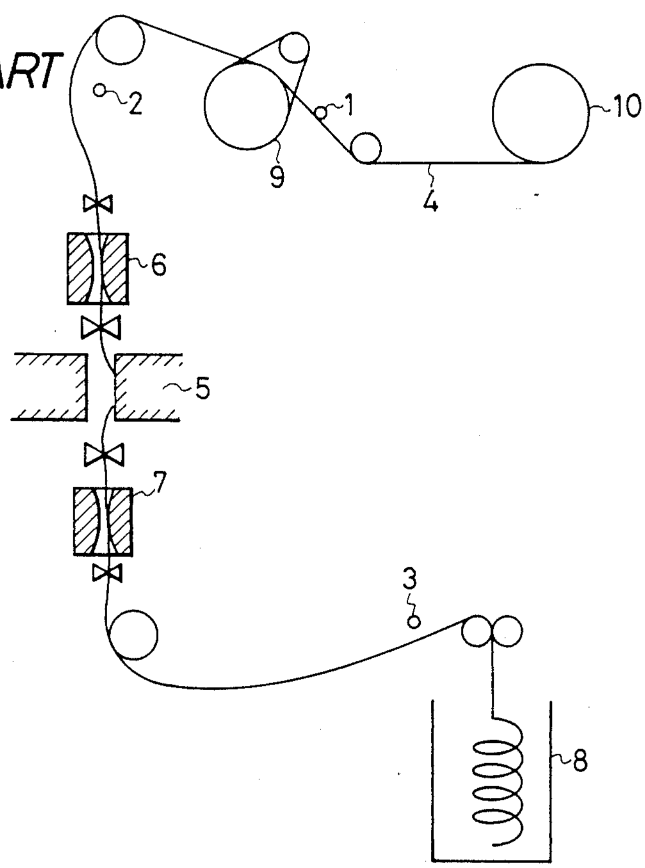
FIG. 2 illustrates the detection system when the wire electrode is broken.
Figure 3:
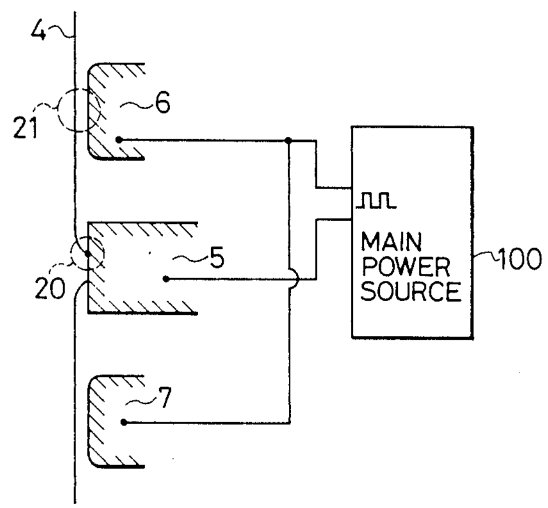
FIG. 3 illustrates a phenomenon occurring in the conventional system when the wire electrode is broken.

In the circuit shown in FIG. 4, instead of the mechanical limit switch 2 in FIG. 1, a detection roller 31 is disposed in substantially the same position as that of the mechanical limit switch 2 of the conventional system, and a wire breakage detection circuit including an optical coupling circuit 30 is arranged between the detection roller 31 and the feeding die 6. The optical coupling circuit 30 includes a photocoupler composed of a light-emitting diode 32 and a photodiode 33, and a transistor 39.

One terminal of the light-emitting diode 32 is connected through a resistor R1 and a d.c. power source 34 to the feeding die 6, and the other terminal is connected through a diode 35 to the detection roller 31. Reference numeral 36 depicts a Zener diode for providing a constant voltage between the die 6 and the roller 31. The cathode of the photodiode 33 is connected to a d.c. source voltage V, and the anode thereof is connected through a buffer amplifier 37 to one input of an AND gate 38, whose output is connected to the base of the transistor 39. The other input of the AND gate 38 is connected to the d.c. source voltage +V.

The emitter of the transistor 39 is grounded, and a detection signal $V_o$ is derived from the collector of the transistor 39. Capacitors $C_1$ to $C_3$ provide smoothing. A resistor R2 is connected between the d.c. source voltage +V and the collector of the transistor 39.

The operation of the electric discharge machine constructed as described above will now be discussed.

Figure 5:
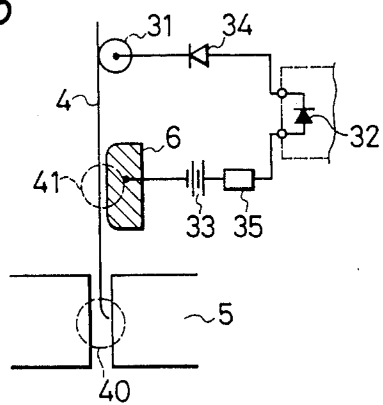
FIG. 5 illustrates breakage of a wire electrode.

When there is no breakage of wire electrode 4 and the wire electrode 4 remains in contact with the feeding die 6 and the detection roller 31, an electric circuit through the light-emitting diode 32 is established, and thus both input signals to the AND gate 38 are high, resulting in conduction of the transistor 39. On the other hand, if the wire electrode 4 breaks and a broken end thereof comes into contact with the workpiece 5 with the wire electrode 4 being separated from the feeding die 6 as shown in FIG. 5, current flow through the light-emitting diode 32 is interrupted, and thus the photodiode 33 becomes nonconductive. As a result, the output of the AND gate 38 becomes a low level, causing the transistor 39 to be turned off. Consequently, the detection signal Vo goes high, indicating breakage of the wire electrode 4.

Figure 6:
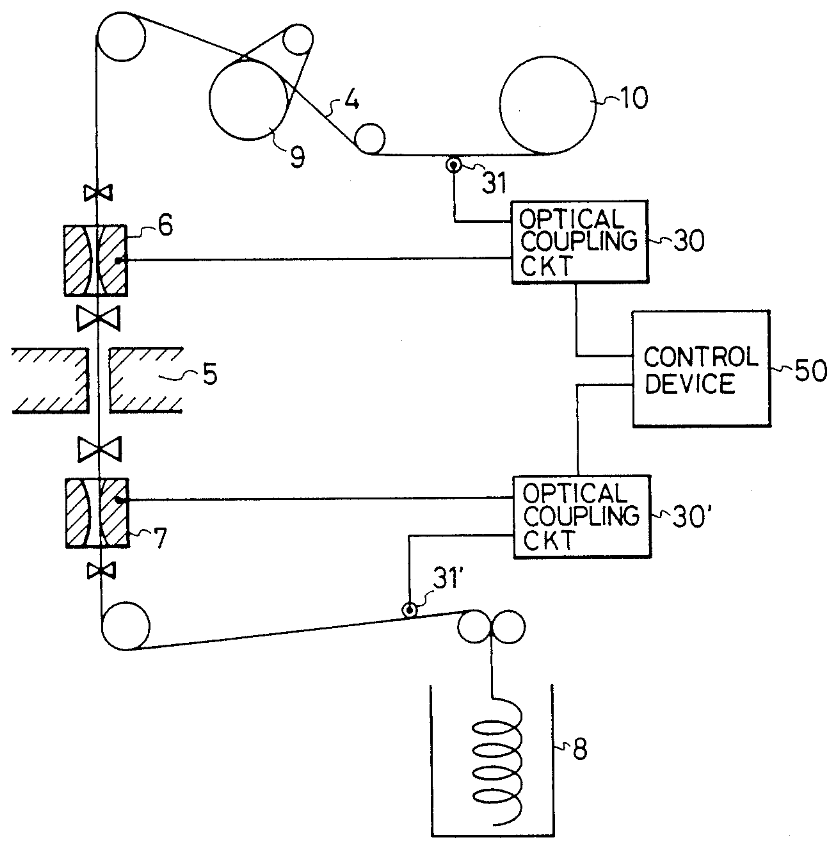
FIG. 6 is a circuit diagram showing another embodiment of the present invention.

FIG. 6 is a circuit diagram of another embodiment of the present invention. In this embodiment, a pair of identical optical coupling circuits 30 and 30' and a pair of identical detection rollers 31 and 31' are employed. According to this embodiment, it is possible to detect when the wire electrode 4 is completely discharged from the supply bobbin 10 as well as when the wire electrode 4 is broken at a point other than a discharge machining point.

A control device 50 is connected to the optical coupling circuits 30 and 30' to control the machine in various manners. The control device 50 may be a numerical control device which responds to detection signals from the optical coupling circuits to control the main power source so as to reduce the power. It is possible to constitute the numerical control device such that it is responsive to the detection signals to instruct stoppage of the relative movement of the table to the wire electrode and/or to store the position of the table at a time instant when wire breakage is detected so that restarting of the machine operation after the breakage is repaired is facilitated.

Since the present invention resides in an electrical detection system using the optical coupling device for detecting breakage of the wire electrode, the response time is considerably shortened. Further, since the detection side and the control side are completely isolated by the use of photocouplers, it is possible to use two different power sources, i.e., the main power source 100 and the d.c. detection power source $+V_o$ without interference therebetween, and thus it is possible to control various components having different operational levels according to the detection signal. In addition, due to the improved response time, no discharge occurs between the feeding die and the wire electrode when wire breakage occurs, resulting in an improvement of the service life of the die.

We claim:

1. A method of detecting breakage of an electrode of an electric discharge machine using a wire electrode, comprising the steps of:

supplying the wire electrode from a supply bobbin through feeding dies and a workpiece to a recovery position, said feeding dies being in contact with said wire electrode;

applying a working voltage between said feeding dies and said workpiece form a main power source;

supplying a current from a detection power source through a loop including a detection roller, a portion of said wire electrode, and one of said feeding dies, said detection roller being in contact with said wire electrode and being separated from said feeding dies; and detecting a variation of said current to thereby detect breakage of said wire electrode.

2. The method claimed in claim 1, wherein said detection power source comprises an optical coupling circuit including a photocoupler.

3. The method claimed in claim 1, further comprising the step of controlling said main power source in response to a detected variation of said current.

4. The method claimed in claim 3, further comprising the step of controlling a numerical control device for instructing relative movement of said workpiece and said wire electrode in response to a detected variation of said current.

5. The method claimed in claim 3, wherein said step of controlling said main power source comprises stopping application of said working voltage.

6. The method claimed in claim 4, wherein said step of controlling said numerical control device comprises terminating an instruction of relative movement between said wire electrode and said workpiece and storing a working position of said workpiece when a variation of said current is detected.

7. A detection device for detecting breakage of an electrode of an electric discharge machine using a wire electrode supplied from a supply bobbin through a workpiece to a recovery position, comprising a numerical control device for instructing relative movement of said workpiece and said wire electrode to machine said workpiece to a desired contoured shape; feeding dies disposed in a path of said wire electrode, said feeding dies being in contact with said wire electrode; a main power source for applying a working voltage between said feeding dies and said workpiece; a detection roller disposed in said path of said wire electrode, said detection roller being in contact with said wire electrode and being separated from said feeding dies; a detection power source for supplying a current flowing in a loop including said detection roller, a portion of said wire electrode and said feeding dies; and means for detecting a variation of said current to thereby detect breakage of said wire electrode.

8. The detecting device claimed in claim 7, wherein said detection power source is a d.c. power source.

9. The detection device claimed in claim 7, wherein said wire breakage detection means comprises means operating in response to a detected variation of said current for terminating supply of power from said main power source.

10. The detection device claimed in claim 9, wherein said detection means is disposed in the vicinity of said feeding dies.

11. The detection device as claimed in claim 7, wherein said wire breakage detection means comprises means operating in response to a detected variation of said current for terminating an instruction from said numerical control means.

12. The detection device claimed in claim 11, wherein said detection means is disposed in the vicinity of said supply bobbin so as to detect presence of said wire electrode on said bobbin as well as to detect breakage of said wire electrode.

13. The detection device claimed in claim 11, wherein said detection means is disposed in the vicinity of said recovery position.

14. The detection device claimed in claim 7, wherein said wire breakage detection means comprises an optical coupling circuit including a photocoupler.

15. The detection device claimed in claim 14, wherein a primary side of said photocoupler is connected to said detection power source.

16. The detection device claimed in claim 15, comprising a transistor, a secondary side of said photocoupler being connected to said transistor, whereby wire breakage is detected according to a state of conduction of said transistor.

* * * * *